United States Patent
Nabeta

(10) Patent No.: US 12,498,221 B2
(45) Date of Patent: Dec. 16, 2025

(54) SYSTEM, DEVICE, AND CONTROL METHOD

(71) Applicant: TOPCON CORPORATION, Tokyo (JP)

(72) Inventor: Yoshinori Nabeta, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 669 days.

(21) Appl. No.: 17/816,963

(22) Filed: Aug. 2, 2022

(65) Prior Publication Data

US 2023/0049076 A1 Feb. 16, 2023

(30) Foreign Application Priority Data

Aug. 10, 2021 (JP) ................................. 2021-130730
Aug. 10, 2021 (JP) ................................. 2021-130732

(51) Int. Cl.
  *G01C 15/00* (2006.01)
  *G01C 25/00* (2006.01)
(52) U.S. Cl.
  CPC ........... *G01C 15/002* (2013.01); *G01C 25/00* (2013.01); *G01C 15/008* (2013.01)
(58) Field of Classification Search
  CPC ..... G01C 15/002; G01C 25/00; G01C 15/008
  See application file for complete search history.

(56) References Cited

U.S. PATENT DOCUMENTS 7,433,028 B2 * 10/2008 Kumagai ............. G01C 15/004
 356/139.03
7,793,424 B2 * 9/2010 Laabs .................. G01C 15/002
 33/290

(Continued)

FOREIGN PATENT DOCUMENTS

CN 210570678 U 5/2020
EP 3686553 A1 7/2020

(Continued)

OTHER PUBLICATIONS

JP-2012063167-A: Kumagai et al., "Laser Survey Device", 2012. (Year: 2012).*

(Continued)

*Primary Examiner* — Kristina M Deherrera
*Assistant Examiner* — Tania Courson
(74) *Attorney, Agent, or Firm* — Chiesa Shahinian & Giantomasi PC

(57) ABSTRACT

A system includes: a device capable of surveying a measurement target or emitting laser light; an acceleration sensor capable of detecting an acceleration of the device; an output unit capable of outputting information; a storage unit configured to store: history information on the acceleration; and a correspondence table including a predetermined condition to be detected based on the acceleration and an operation detail in correspondence with each other; and a control unit configured to control output of the output unit based on the operation detail corresponding to the predetermined condition of the device associated in accordance with the history information, if the acceleration detected by the acceleration sensor is determined to correspond to the predetermined condition.

6 Claims, 10 Drawing Sheets

(56) References Cited

U.S. PATENT DOCUMENTS

| | | | | |
|---|---|---|---|---|
| 7,884,923 | B2* | 2/2011 | Kumagai | G01S 7/4814 |
| | | | | 356/5.01 |
| 8,857,068 | B2 | 10/2014 | Kodaira | |
| 8,959,783 | B2* | 2/2015 | Kumagai | G01C 15/002 |
| | | | | 33/291 |
| 9,377,303 | B2* | 6/2016 | Giger | G08C 17/00 |
| 9,909,871 | B2* | 3/2018 | Kumagai | G01C 15/008 |
| 10,809,360 | B2* | 10/2020 | Ohtomo | G01S 17/89 |
| 11,536,568 | B2* | 12/2022 | Nishita | G01C 15/06 |
| 12,152,880 | B2* | 11/2024 | Nishita | G01C 15/002 |
| 2007/0103671 | A1 | 5/2007 | Ash | |
| 2013/0000133 | A1 | 1/2013 | Kodaira | |
| 2013/0152412 | A1 | 6/2013 | Kumagai et al. | |
| 2016/0320473 | A1 | 11/2016 | Matsumoto et al. | |
| 2016/0349051 | A1* | 12/2016 | Kumagai | G01C 15/002 |
| 2017/0227357 | A1* | 8/2017 | Ohtomo | G01C 5/00 |
| 2017/0306747 | A1 | 10/2017 | Parfitt et al. | |
| 2019/0063922 | A1* | 2/2019 | Ohtomo | G01C 1/00 |
| 2019/0072385 | A1 | 3/2019 | Lombardi et al. | |
| 2019/0368871 | A1 | 12/2019 | Ito | |

FOREIGN PATENT DOCUMENTS

| | | |
|---|---|---|
| JP | 2011-203130 A | 10/2011 |
| JP | 2012063167 A | 3/2012 |
| JP | 2016211873 A | 12/2016 |
| JP | 2019211220 A | 12/2019 |
| WO | 2016/039053 A1 | 3/2016 |

OTHER PUBLICATIONS

Extended European Search Report mailed Jan. 13, 2023 in connection with European Patent Application No. 22188815.9, 10 pgs.

Notice of Reasons for Refusal mailed Apr. 8, 2025, in connection with Japanese Patent Application No. 2021-130730, 8 pgs. (including translation).

Notice of Reasons for Refusal mailed Apr. 8, 2025, in connection with Japanese Patent Application No. 2021-130732, 8 pgs. (including translation).

\* cited by examiner

SYSTEM, DEVICE, AND CONTROL METHOD

CROSS-REFERENCE TO RELATED APPLICATIONS

This application claims priority to Japanese Patent Applications Nos. 2021-130730 and 2021-130732, both filed on Aug. 10, 2021, the disclosures of all are incorporated herein by reference in their entirety.

FIELD

The present disclosure relates to a system, a device, and a control method.

BACKGROUND

Rotating laser devices have been suggested which emit laser light around the outer periphery while rotating the laser light to allow marking along a predetermined plane. For example, a rotating laser device according to Japanese Unexamined Patent Publication No. 2011-203130 includes a light emitting unit that emits laser light and a rotary unit that rotationally projects the laser light so as to form a reference plane.

For example, as disclosed in International Patent Publication No. WO 2016/039053, a surveying device such as a total station collimates a measurement target to measure its horizontal and vertical orientations, and irradiates the measurement target with distance measuring light to measure the distance from the surveying device to the measurement target. At the time of surveying with the surveying device, first, an installation work of making the station point and the observation point on the ground to coincide for leveling is performed. After the installation, the surveying device can survey the measurement target from the reference point.

SUMMARY

For accurate marking (i.e., formation of a reference plane) by a rotating laser device, there is a need to stabilize the rotating laser device as installed. However, if a user checks the completion of the installation and proper timing of laser light emission (e.g., when the device receives less vibrations from the surrounding environment), this work may take time and effort and vary depending on the skill.

For accurate surveying, there is a need to stabilize the surveying device as installed. However, if a user checks the completion of the installation and proper timing of surveying (e.g., when the device receives less vibrations from the surrounding environment), this work may take time and effort and vary depending on the skill.

It is an objective of the present disclosure to provide a highly convenient system, device, and control method, while grasping the condition of the device. For example, a highly convenient rotating laser system, rotating laser device, and control method are provided, while grasping the condition of the rotating laser device. Alternatively, highly convenient surveying system, surveying device, and control method are provided, while grasping the condition of the surveying device.

In order to achieve the objective described above, a system according to the present disclosure includes: a device capable of surveying a measurement target or emitting laser light; an acceleration sensor capable of detecting an acceleration; an output unit capable of outputting information; a storage unit configured to store: history information on the acceleration; and a correspondence table including a predetermined condition to be detected based on the acceleration and an operation detail in correspondence with each other; and a control unit configured to control output of the output unit based on the operation detail corresponding to the predetermined condition of the surveying device associated in accordance with the history information, if the acceleration detected by the acceleration sensor is determined to correspond to the predetermined condition.

In order to achieve the objective described above, a device according to the present disclosure includes: a surveying unit capable of surveying a measurement target or a rotating laser emitting unit capable of emitting laser light; an acceleration sensor capable of detecting an acceleration; an output unit capable of outputting information; a storage unit configured to store: history information on the acceleration; and a correspondence table including a predetermined condition to be detected based on the acceleration and an operation detail in correspondence with each other; and a control unit configured to control output of the output unit based on the operation detail corresponding to the predetermined condition to be detected associated in accordance with the history information, if the acceleration detected by the acceleration sensor is determined to correspond to the predetermined condition.

In order to achieve the objective described above, a control method according to the present disclosure is a control method of a system. The system includes: a device capable of surveying a measurement target or emitting laser light; an acceleration sensor capable of detecting an acceleration of the surveying device; an output unit capable of outputting information; and a storage unit configured to store: history information on the acceleration; and a correspondence table including a predetermined condition to be detected based on the acceleration and an operation detail in correspondence with each other. The control method includes: determining whether the acceleration detected by the acceleration sensor corresponds to the predetermined condition of the device associated in accordance with the history information; and controlling output of the output unit based on the operation detail corresponding to the predetermined condition, if the acceleration detected is determined to correspond to the predetermined condition.

The system, device, and control method according to the present disclosure using the means described above are highly convenient, while grasping the condition of the device. For example, highly convenient rotating laser system, rotating laser device, and control method are provided, while grasping the condition of the rotating laser device. Alternatively, for example, highly convenient surveying system, a surveying device, and a control method are provided, while grasping the condition of the surveying device.

DETAILED DESCRIPTION

First Embodiment

A first embodiment of the present disclosure will be described below with reference to the drawings.

Figure 1:
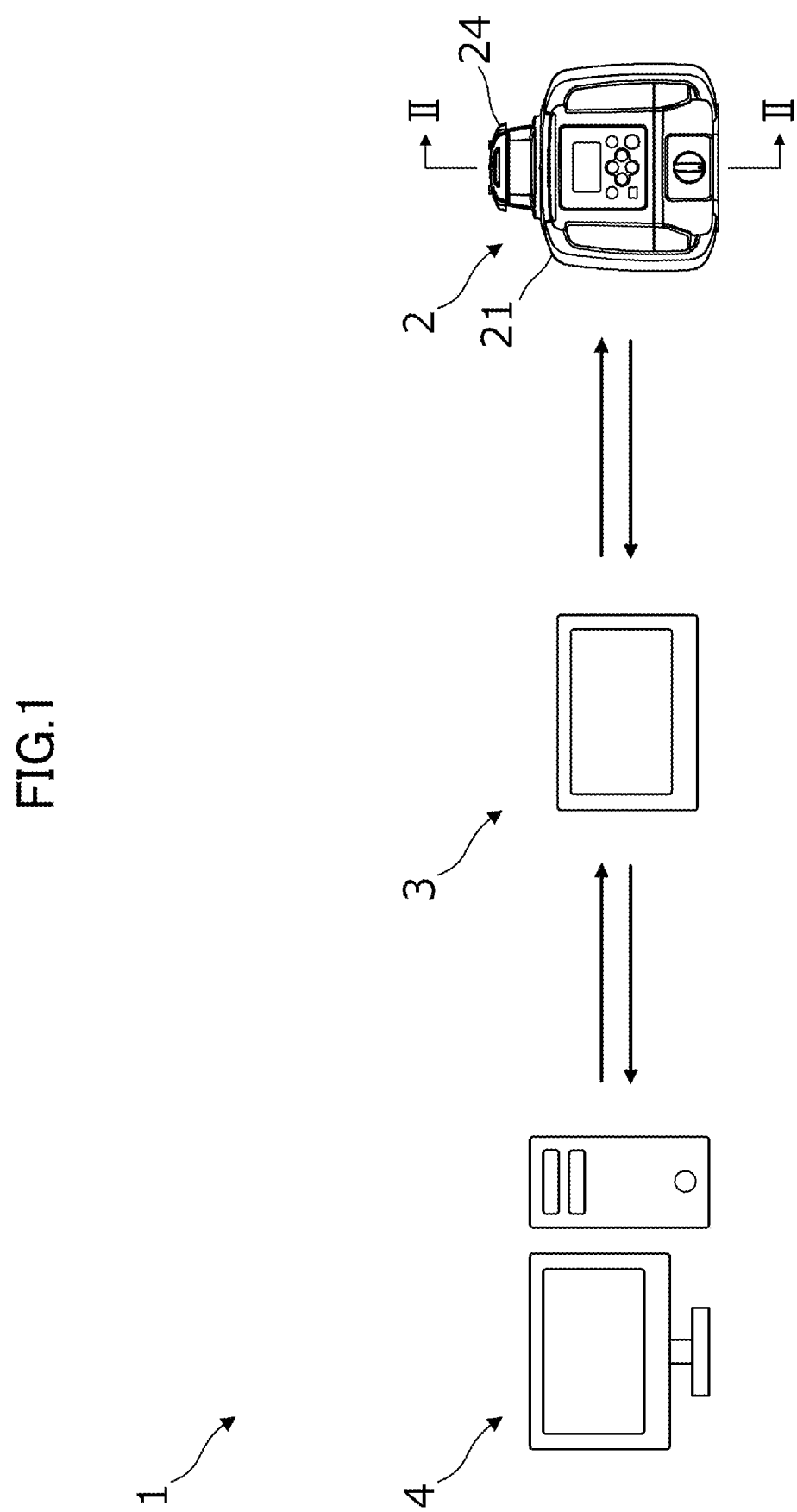
FIG. 1 shows an overall configuration of a rotating laser system according to a first embodiment of the present disclosure.

FIG. 1 shows an overall configuration of a rotating laser system 1 according to the first embodiment of the present disclosure. Note that the structures and arrangements of devices are shown schematically and different from actual scales for the sake of simplicity of description.

The rotating laser system 1 includes a rotating laser device 2, a terminal 3, and an external device 4. In this embodiment, the rotating laser device 2 and the terminal 3 are communicably connected to each other. The terminal 3 and the external device 4 are also communicably connected to each other. Examples of a communication means include a wireless communication means such as Bluetooth (registered trademark); It is also possible to use a wired communication means connected via connection terminals. The rotating laser device 2 is installed on one of legs (not shown) (e.g., a fixed core rod) of a tripod, and irradiates an object with laser light while rotating the emission direction around the outer periphery for marking. In addition, the rotating laser device 2 forms, using the laser light, a reference plane which can be used to set a construction reference in civil engineering or other works. The rotating laser device 2 includes a leveler that is supported by legs and performs leveling. Leveling may be performed manually by an operator by adjusting the legs, or may be automatic leveling.

The terminal 3 may be any device such as a personal computer, a tablet, a smartphone, or a personal digital assistant (PDA). The terminal 3 may function to operate the rotating laser device 2 at a remote site.

Figure 4:
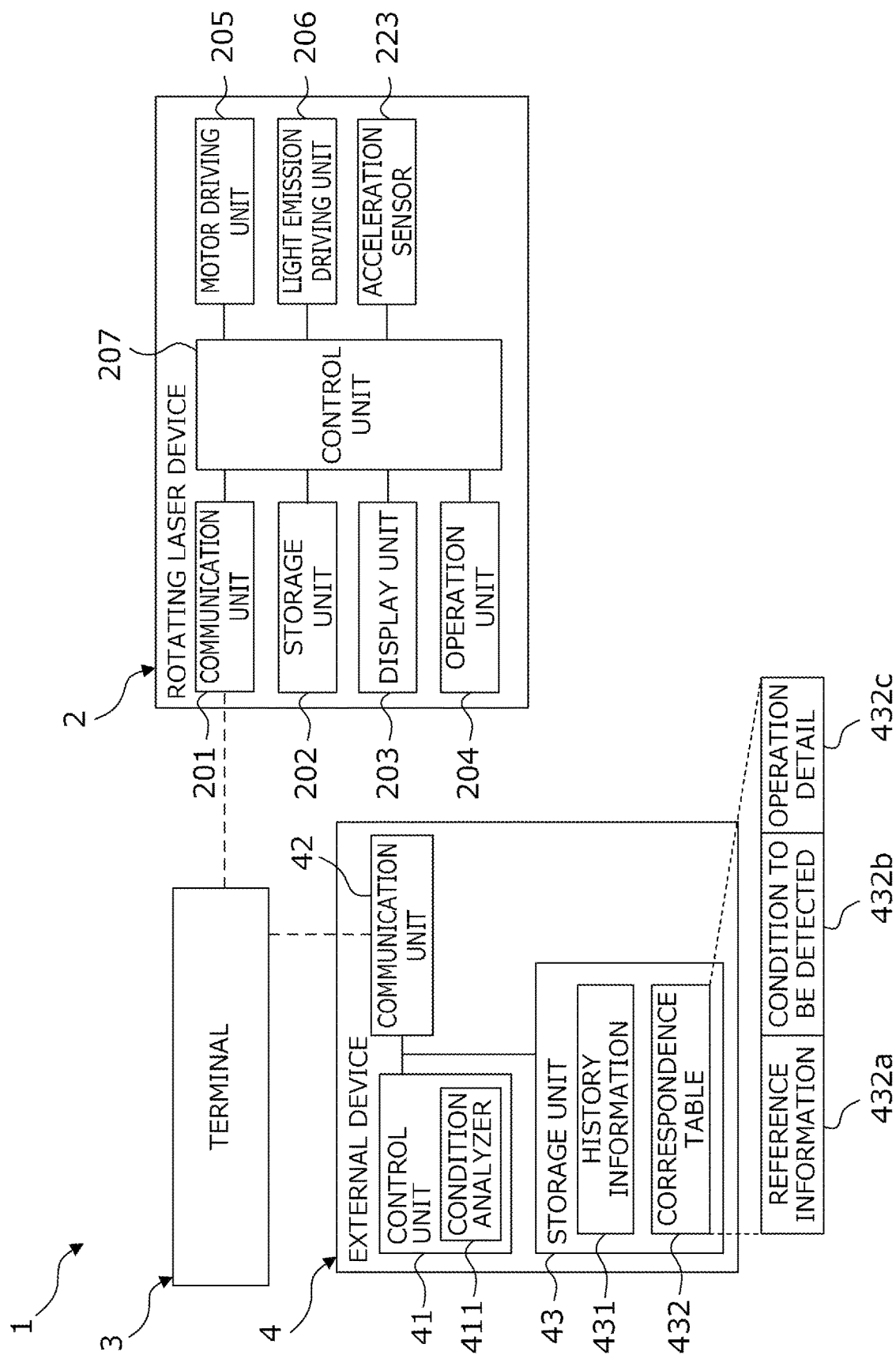
FIG. 4 is a control block diagram of the rotating laser system.

The external device 4 stores history information 431 on vibrations obtained by the rotating laser device 2, reference information 432a, and other information (see FIG. 4). The external device 4 may be a server (e.g., an on-premise server or a cloud server) connected via a network such as a local area network (LAN) or a wide area network (WAN).

Figure 2:
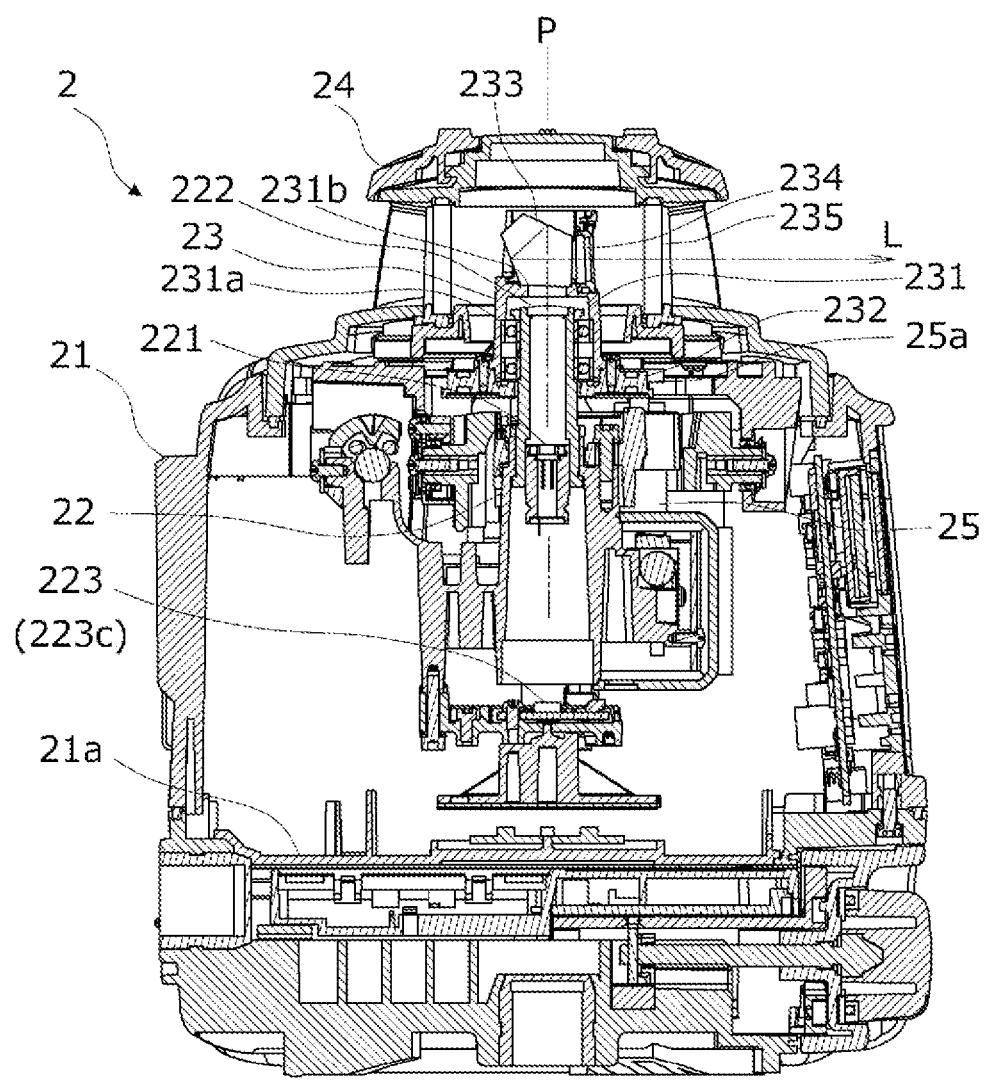
FIG. 2 is a cross-sectional view of a rotating laser device in FIG. 1 taken along line II-II.

FIG. 2 is a cross-sectional view of the rotating laser device 2 in FIG. 1 taken along line II-II. The rotating laser device 2 includes a light projecting section 22 housed in a housing 21, and a rotary section 23 connected to the housing 21 and the light projecting section 22 so as to be rotatable about a rotation axis P. Attached to the top of the housing 21 is an upper housing 24 which forms a space capable of housing an upper part of the rotary section 23. Provided below the rotating laser device 2 is the leveler (not shown in detail) capable of leveling and adjusting the rotating laser device 2.

The light projecting section 22 is in a hollow cylindrical shape suspended from the top plate while being spaced apart from (i.e., floating above) the bottom surface 21a in the housing 21. The light projecting section 22 includes therein a light emitting element (e.g., a laser diode) 221 that emits laser light L. The light emitting element 221 is disposed such that the rotation axis P and the optical axis are coaxial with each other. The laser light emitted from the light emitting element 221 is guided upward along the rotation axis P. In addition, the light projecting section 22 includes a condenser lens 222 that condenses the laser light L on the optical path of the laser light emitted from the light emitting element 221.

The light projecting section 22 includes an acceleration sensor 223 (namely, a third acceleration sensor 223c) substantially on the rotation axis P and below the light emitting element 221 (see also the control block diagram of FIG. 4). The acceleration sensor 223 detects an acceleration in accordance with an impact on or an inclination of the rotating laser device 2.

Figure 3A:
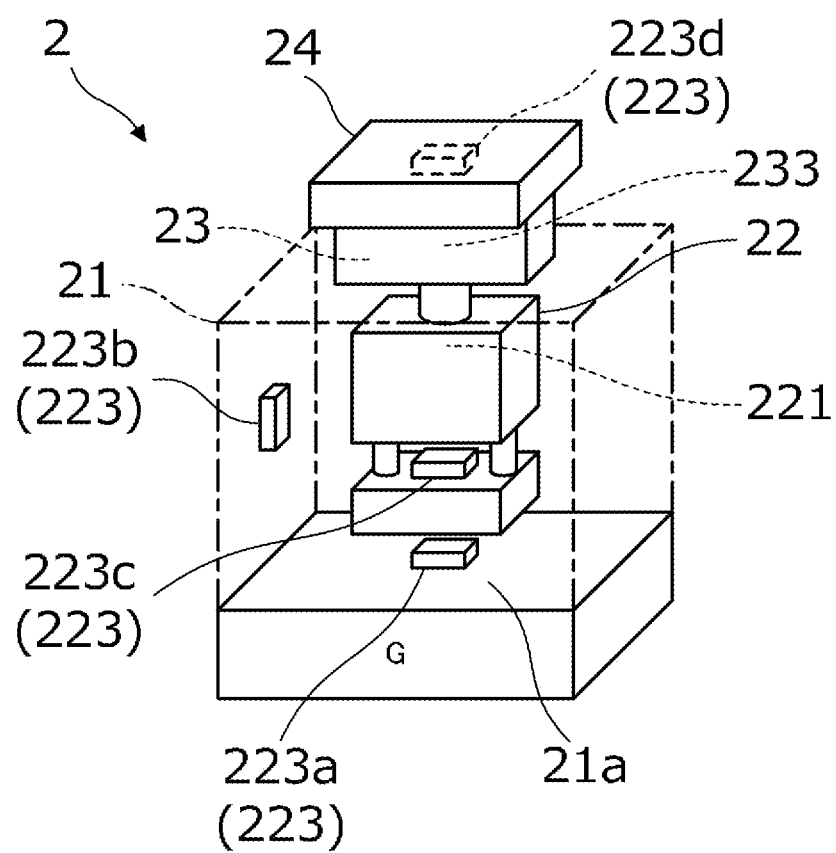
FIG. 3A is a perspective view schematically showing a rotating laser device placed horizontally.

FIG. 3A is a perspective view schematically showing the rotating laser device 2. The rotating laser device 2 may include one or more acceleration sensors 223. The rotating laser device 2 according to this embodiment includes four acceleration sensors 223 (223a to 223d) at four positions.

The first acceleration sensor 223a is located on the bottom surface 21a, that is, at a lower part of the housing 21. The second acceleration sensor 223b is located on a sidewall of the housing 21 above the first acceleration sensor 223a. The third acceleration sensor 223c is located below the light emitting element 221 of the light projecting section 22 (i.e., on the side opposite to the support end of the light emitting element 221). The fourth acceleration sensor 223d may be located around the top plate of the upper housing 24. In this manner, the acceleration sensors 223 are placed at a part or all of the following positions: a position substantially equal to the gravity center of the rotating laser device 2 (i.e., the location of the third acceleration sensor 223c in the example of FIG. 3A); a position closer to the support end than the gravity center (i.e., the location of the first acceleration sensor 223a closer to the bottom surface 21a in the example of FIG. 3A); and a position closer to a free end opposite to the support end, which is to be fixed to a mount (for example, a ground surface, a leg etc.), than the gravity center (i.e., a position closer to the upper housing 24 in the example of FIG. 3A).

Referring back to FIG. 2, the rotary section 23 is rotatable by connecting the outer peripheral surface at the upper end of the cylindrical light projecting section 22 and a recessed engagement part 231 open downward via a bearing 231a. The rotary section 23 includes a spur driven gear 232 projecting radially outward in a flange shape. The top of the condenser lens 222, which corresponds to the bottom of the engagement part 231, has an opening 231b. The rotation of the rotary section 23 is controlled by a spur driving gear 25a meshing the driven gear 232, the driving gear of a motor 25 being arranged in the housing 21.

The rotary section 23 includes a pentaprism 233 on the rotation axis P above the opening 231b. The pentaprism 233 converts the optical axis of the laser light L emitted vertically upward from the condenser lens 222 of the light projecting section 22 into the horizontal direction, and emits the laser light L to the outside via a condenser lens 234 and a translucent member 235. In this manner, the light projecting section 22 and the rotary section 23 form a rotating laser projecting unit capable of emitting the laser light L.

FIG. 4 is a control block diagram of the rotating laser system 1. First, a configuration of the rotating laser device 2 will be described. A communication unit 201 is a communication means communicative with the terminal 3 and other devices. A storage unit 202 stores various programs necessary for driving the rotating laser device 2. The programs include a light emission control program for controlling light emission of the light emitting element 221 by a light emission driving unit 206, a communication program for communications with devices such as the terminal 3, and other programs.

A display unit 203 displays operation conditions, settings, and other characteristics of the rotating laser device 2. An operation unit 204 is an operation means for inputting various operation instructions and settings. For example, the operation instructions may include instructions on ON/OFF switching of a power source, a trigger for starting emission of laser light, switching of modes, and other operations. The operation unit 204 may include any operation device or input device such as a switch, a button, or a dial. If the display unit 203 is a touch panel, the display unit 203 and the operation unit 204 may be formed integrally.

A motor driving unit 205 drives the motor 25 shown in FIG. 2 to rotate the driving gear 25a meshing with the driven gear 232 of the rotary section 23, thereby controlling the rotation of the rotary section 23. The light emission driving unit 206 controls light emission of the light emitting element 221 in accordance with the light emission control program executed by a control unit 207.

When an external force vibrates the rotating laser device 2 or changes the attitude of the rotating laser device 2, the acceleration sensor 223 detects an acceleration in accordance with the transmitted vibration or the change in the attitude. The acceleration sensor 223 is connected to the control unit 207 mounted on the rotating laser device 2. Upon detection of an acceleration by the acceleration sensor 223, the control unit 207 is capable of determining that the rotating laser device 2 has received the vibration from the outside or the attitude of the rotating laser device 2 has changed. Note that the control unit 207 averages detection values detected by the acceleration sensors 223 at a predetermined number of detection times, and uses the average thus obtained as the acceleration to be processed in this embodiment. The acceleration sensor 223 may be placed in the housing 21, for example, directly or indirectly via another internal member.

A fourth acceleration sensor 223d around the upper housing 24 is displaced at a large amount when the rotating laser device 2 vibrates. With the use of the fourth acceleration sensor 223d, the control unit 207 is capable of detecting the displacement or other changes of the rotating laser device 2 with a high detection sensitivity. Assume that fourth acceleration sensors 223d are placed at two positions on the left and right of the upper housing 24. In this case, the fourth acceleration sensors 223d are located opposite to and apart from the surface, on which the rotating laser device 2 is mounted. Hence, the fourth acceleration sensor 223d is capable of detecting, with a high detection sensitivity, the abnormal vibration or inclination of the rotating laser device 2 with respect to the mounting surface as a fulcrum. The fourth acceleration sensors 223d at the two positions may perform differential detections to detect the inclination of the rotating laser device 2 with a high accuracy.

Note that the number and positions of the acceleration sensors 223 (223a to 223d) are examples. It is also possible to provide one or more acceleration sensors 223 at any position(s) of the rotating laser device 2. The acceleration sensor(s) 223 may be provided at a part of the positions shown in FIG. 3A or in addition to the positions shown in FIG. 3A.

The control unit 207 is located inside the rotating laser device 2. The control unit 207 performs obtainment, storage, calculation, and other operations of various information, and displays results of obtainment and calculation on the display unit 203, for example. In addition, the control unit 207 performs a drive control and other operations of each unit in accordance with an operation on the operation unit 204 or a calculation result.

The terminal 3 includes a control unit, a storage unit, an operation unit, a display unit, a communication unit, and other units (details are not shown). The terminal 3 transmits and receives information to and from the rotating laser device 2 and the external device 4 via the communication unit. In addition, the terminal 3 operates the rotating laser device 2 at a remote site in accordance with an input operation to the operation unit, obtains information such as an operation condition of the rotating laser device 2 and the acceleration(s) detected by the acceleration sensor(s) 223, and displays the obtained information on the display unit.

The external device 4 includes a control unit 41, a communication unit 42, and a storage unit 43. The storage unit 43 stores the history information 431, which is the past detection history of the accelerations detected by the acceleration sensor(s) 223 of the rotating laser device 2, and a correspondence table 432. The external device 4 obtains inputs related to the accelerations detected by the acceleration sensor(s) 223 of the rotating laser device 2 via the communication unit 201, the terminal 3, and the communication unit 42. The external device 4 then stores the obtained inputs as the history information 431. The history information 431 may include, for example, detection values of accelerations, detection times, and the conditions of the rotating laser device 2 (e.g., a condition where a large vibration or inclination occurs due to an earthquake or a blast) at the times of detection in correspondence with each other. The rotating laser device 2 stores the accelerations detected by the acceleration sensor(s) 223 as the history information 431. At this time, if a detected acceleration is greater than or equal to a predetermined threshold value, the rotating laser device 2 may store the acceleration as the history information 431. If the detected acceleration is smaller than the predetermined threshold value, the rotating laser device 2 may not include the acceleration in the history information 431.

The correspondence table 432 stores the reference information 432a set based on the history information 431, conditions 432b to be detected of the rotating laser device 2, and operation details 432c corresponding to the reference information 432a. The reference information 432a is set based on the history information 431. For example, an absolute value or a relative value set in advance with respect to an acceleration under a normally operatable condition of the rotating laser device 2 may be set as a threshold for abnormality determination. Patterns of detecting an acceleration at the occurrence of abnormality in the past according to the history information 431 may be set as criteria for abnormality determination.

The reference information 432a includes threshold values and patterns of the vibrations and displacements of the rotating laser device 2. The reference information 432a is set in correspondence to the conditions 432b to be detected such as shaking of a heavy machine, shaking due to wind, shaking when installed on an upper floor, shaking at the time of an earthquake, impact when another object collides with the rotating laser device 2, or erroneous leveling of the rotating laser device 2. That is, the conditions 432b to be detected are external physical factors classifiable based on accelerations and affecting the accuracy of marking or other operations of the rotating laser device 2.

The operation details 432c are details of operations in response to the conditions 432b to be detected. One or both of an abnormality handling operation and a condition transition can be included as output control. The abnormality handling operation includes stop or prohibition of emission of laser light by the light projecting section 22. In addition, the abnormality handling operation includes a display, an audio output, a lighting display, and other types of alerts (a speaker and a light emitting unit are not shown) at the time of abnormality determination.

As a condition transition, the rotating laser device 2 starts in the background. If an input of the acceleration detected by an acceleration sensor 223 indicates that the rotating laser device 2 is 2detected to be horizontally installed and placed on (fixed to) a mount (for example, a ground surface, a leg etc.), the control unit 207 activates the main power supply and displays "Available" on the display unit 203.

The patterns of detecting the acceleration using the acceleration sensor(s) 223 (including the detection of accelerations using a plurality of acceleration sensors 223 (223a to 223d)) have a certain correlation with vibrations, changes in the attitude, and other characteristics that affect the marking accuracy of the rotating laser device 2. For example, the acceleration at the occurrence of an earthquake or a blast is detected as a value greater than the acceleration at a normal time. If the rotating laser device 2 is leveled and the accelerations detected by the acceleration sensor(s) 223 less vary, completion of installation can be determined. Accordingly, the control unit 41 may function as a condition analyzer 411 that determines which of the conditions 432b to be detected a newly detected acceleration corresponds to by executing a trained program trained by machine learning (what is called "deep learning") using the accelerations stored in the past history information 431 and the condition of the rotating laser device 2 as training data. The machine learning program and the trained program can be stored in the storage unit 43.

Figure 5:
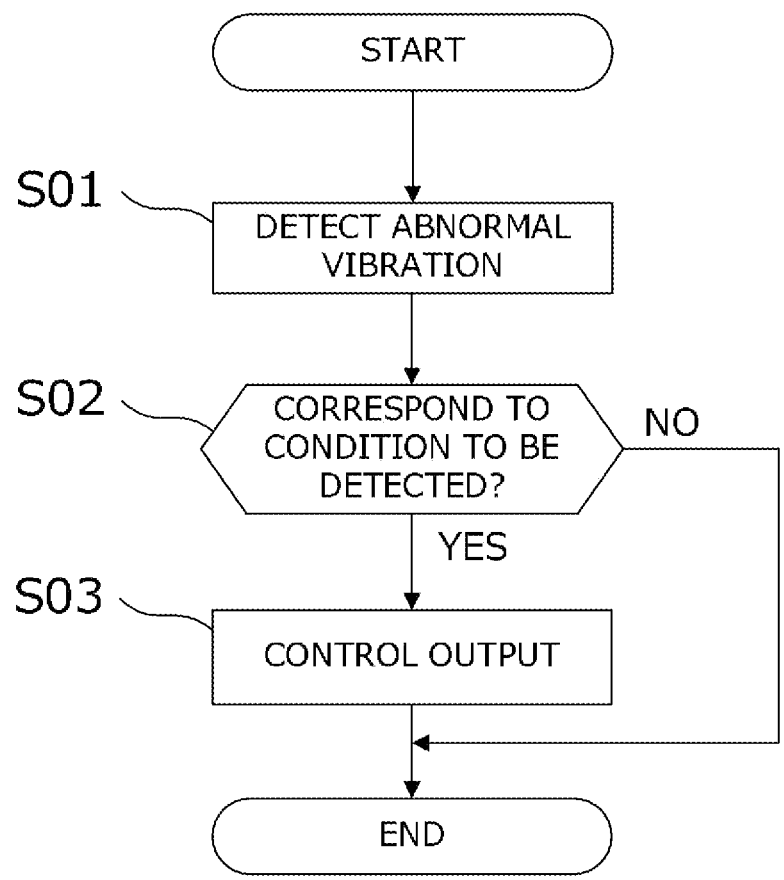
FIG. 5 is a flowchart showing a control method of the rotating laser system.

Here, with reference to FIG. 5, for example, steps of a control method of the rotating laser system 1 will be described. First, in step S01, the control unit 207 detects an abnormal vibration of the rotating laser device 2. Whether there is an abnormal vibration is determined based on whether the rotating laser device 2 receives a vibration, for example, from the outside and an acceleration greater than or equal to a predetermined threshold value is detected by an acceleration sensor 223. If the input of the acceleration detected by the acceleration sensor 223 is greater than or equal to the predetermined threshold value, the control unit 207 determines that an abnormal vibration has been detected and the process proceeds to step S02. Assume that a plurality of acceleration sensors 223 are used. In step S01, the control unit 207 determines the detection of an abnormal vibration, if some or all of the accelerations detected by the acceleration sensors 223 are determined to be greater than or equal to a predetermined threshold value.

In step S02, the control unit 207 refers to the correspondence table 432 stored in the external device 4 via the communication unit 201, and determines whether the acceleration(s) detected in step S01 correspond(s) to the reference information 432a (e.g., meet(s) a set threshold value or correspond(s) to any of the patterns). Whether the detected acceleration(s) correspond(s) to the reference information 432a may be determined based on the acceleration(s) detected by a part of the acceleration sensors 223 or comprehensively based on the accelerations detected by the acceleration sensors 223. The control unit 207 performs the processing in step S03, if the determination in step S02 is true (Yes), and ends the process, if the determination in step S02 is false (No).

In step S02, the control unit 207 may determine whether the acceleration(s) detected by the acceleration sensor(s) 223 corresponds to any of conditions 432b to be detected, by executing a trained program that has trained using the accelerations according to the past history information 431 and the condition of the rotating laser device 2. In this case as well, the control unit 207 performs the processing in step S03, if the determination in step S02 is true (Yes), and ends the process, if the determination in step S02 is false (No). In step S02, the control unit 207 may make the determination using one or both the reference information 432a and the trained program.

In step S03, the control unit 207 performs output control of the output unit capable of outputting information on the communication unit 201, the display unit 203, or other units in accordance with one of the operation details 432c corresponding to the condition 432b to be detected as determined in step S02, using the correspondence table 432. The information outputtable by the output unit may include a control signal, for example. The output unit may be a driver or other devices that control each function (element, driver, etc.) in the rotating laser device 2.

An example of the operation details 432c is as follows: If an acceleration detected by an acceleration sensor 223 is determined to be caused by "shaking at the time of an earthquake", the control unit 207 stops or prohibits the emission of laser light, or causes the display unit 203 to display the detection of an earthquake motion.

Figure 3B:
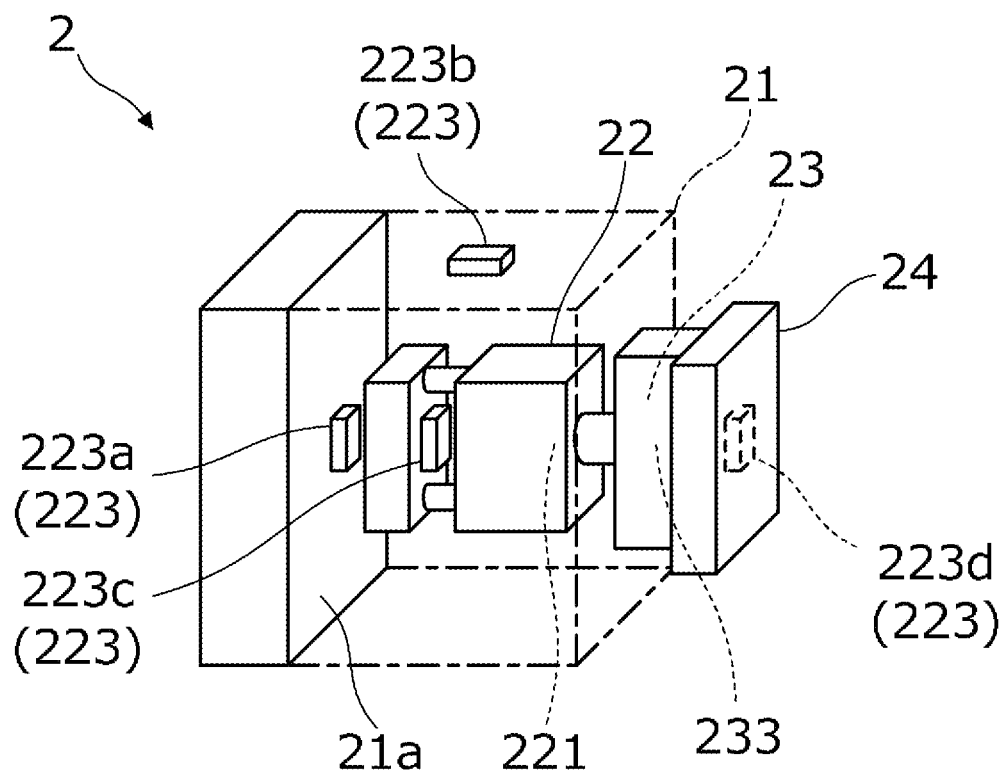
FIG. 3B is a perspective view schematically showing a rotating laser device placed vertically.

For example, as shown in FIG. 3B, another example of the operation details 432c is as follows. Assume that an acceleration is determined to be detected by an accelerator sensor 223 when the rotating laser device 2 is placed vertically (i.e., "V-placement")(i.e., when the rotating laser device 2 has the attitude capable of emitting laser light on a vertical plane with the axis extending horizontally). In this case, the control unit 207 changes the settings and the operation mode of the rotating laser device 2. Alternatively, when determining whether the rotating laser device 2 is inclined (i.e., under a condition to be detected) using the average of values detected by the acceleration sensors 223, the control unit 207 optimizes the number, i.e., selects a proper number of times (times for averaging) of detecting values used for calculating the average. For example, assume that the rotating laser device 2 is determined to be inclined based on a sudden vibration received by the rotating laser device 2. In this case, since the inclination determination of the rotating laser device 2 is based on erroneous detection, the control unit 207 changes settings, for example, increases the number of times for averaging to obtain the average used for the inclination determination of the rotating laser device 2.

In this manner, for example, the control unit 207 optimizes the number of times for averaging the detection values detected by the acceleration sensor(s) 223, when forming a reference plane (e.g., a gradient plane) by laser light using the values detected by the acceleration sensor(s) 223. In addition, the control unit 207 also optimizes the number of times for averaging the detection values at the time of automatic leveling using what is called a "photoelectric tilt sensor". For example, when the number of times for averaging the values detected by the acceleration sensor(s) 223 increases, the control unit 207 is capable of increasing the number of times for averaging the values detected by a light receiving sensor that detects bubbles in a bubble tube used for the photoelectric tilt sensor.

The following configuration has been described above in this embodiment. The rotating laser system 1 includes: the rotating laser device 2 capable of emitting laser light; an acceleration sensor 223 capable of detecting an acceleration of the rotating laser device 2; the output unit capable of outputting information; the storage unit 43 configured to store the history information 431 on the acceleration and the correspondence table 432 including a predetermined condition 432b to be detected based on to the acceleration and an operation detail 432c in correspondence with each other; and the control unit 207 configured to control output of the output unit based on the operation detail 432c corresponding to the predetermined condition 432b of the rotating laser device 2 associated in accordance with the history information 431, if the acceleration detected by the acceleration sensor 223 is determined to correspond to the predetermined condition 432b. This configuration reduces erroneous constructions and allows automatic switching of the operation modes of the rotating laser device 2. In addition, this configuration allows reference to the past history information 431 of the rotating laser device 2 and thus allows check of the condition of the rotating laser device 2 in an emergency or abnormal situation. Accordingly, highly convenient rotating laser system 1, rotating laser device 2, and control method are provided, while grasping the condition of the rotating laser device 2.

The first embodiment of the present disclosure has been described above. The aspects of the present disclosure are not limited to this first embodiment.

For example, while a configuration has been described above in the first embodiment where the rotating laser device 2 is capable of communicating with the external device 4 via the terminal 3, the rotating laser device 2 may communicate with the external device 4 directly.

The history information 431 and the correspondence table 432 may be stored in a single device (the external device 4 in this embodiment) or in a plurality of devices.

The output unit controllable by the control unit 207 is not limited to a functional unit in the rotating laser device 2, and may be a functional unit of the terminal 3, the external device 4, or another device.

The following is exemplary disclosure of the first embodiment.

[1] A rotating laser system including:
a rotating laser device capable of emitting laser light;
an acceleration sensor capable of detecting an acceleration of the rotating laser device;
an output unit capable of outputting information;
a storage unit configured to store: history information on the acceleration; and a correspondence table including a predetermined condition to be detected based on the acceleration and an operation detail in correspondence with each other; and
a control unit configured to control output of the output unit based on the operation detail corresponding to the predetermined condition to be detected of the rotating laser device associated in accordance with the history information, if the acceleration detected by the acceleration sensor is determined to correspond to the predetermined condition to be detected.

[2] The rotating laser system of [1], wherein
the control unit functions as a condition analyzer capable of determining whether the acceleration detected by the acceleration sensor corresponds to any one of conditions to be detected, by executing a trained program that has trained using the acceleration according to the history information and a condition of the rotating laser device.

[3] The rotating laser system of [1], wherein
the correspondence table includes reference information that is a determination criterion set based on the history information in correspondence with the predetermined condition to be detected and the operation detail, and
the control unit determines which of conditions to be detected the acceleration detected by the acceleration sensor corresponds to, if the acceleration satisfies the determination criterion.

[4] The rotating laser system of any one of [1] to [3], wherein
the acceleration is obtained by averaging values detected by the acceleration sensor at a predetermined number of detection times.

[5] The rotating laser system of any one of [1] to [4], wherein
the operation detail includes a plurality of operation details corresponding to one or both of an abnormality handling operation and a condition transition.

[6] The rotating laser system of any one of [1] to [5], wherein
the acceleration sensor is placed at any or each of: a gravity center of the rotating laser device; a position closer to a support end than the gravity center; and a position closer to a free end opposite to the support end than the gravity center.

[7] A rotating laser device including:
a rotating laser projecting unit capable of emitting laser light;
an acceleration sensor capable of detecting an acceleration;
an output unit capable of outputting information;
a storage unit configured to store: history information on the acceleration; and a correspondence table including a predetermined condition to be detected based on the acceleration and an operation detail in correspondence with each other; and
a control unit configured to control output of the output unit based on the operation detail corresponding to the predetermined condition to be detected associated in accordance with the history information, if the acceleration detected by the acceleration sensor is determined to correspond to the predetermined condition.

[8] A control method of a rotating laser system including:
a rotating laser device capable of emitting laser light; an acceleration sensor capable of detecting an acceleration of the rotating laser device; an output unit capable of outputting information; and a storage unit configured to store: history information on the acceleration; and a correspondence table including a predetermined condition to be detected based on the acceleration and an operation detail in correspondence with each other, the control method including:
determining whether the acceleration detected by the acceleration sensor corresponds to the predetermined condition to be detected of the rotating laser device associated in accordance with the history information; and
controlling output of the output unit based on the operation detail corresponding to the predetermined condition to be detected, if the acceleration detected is determined to correspond to the predetermined condition.

Embodiment 2

Next, a second embodiment of the present disclosure will be described with reference to the drawings.

Figure 6:
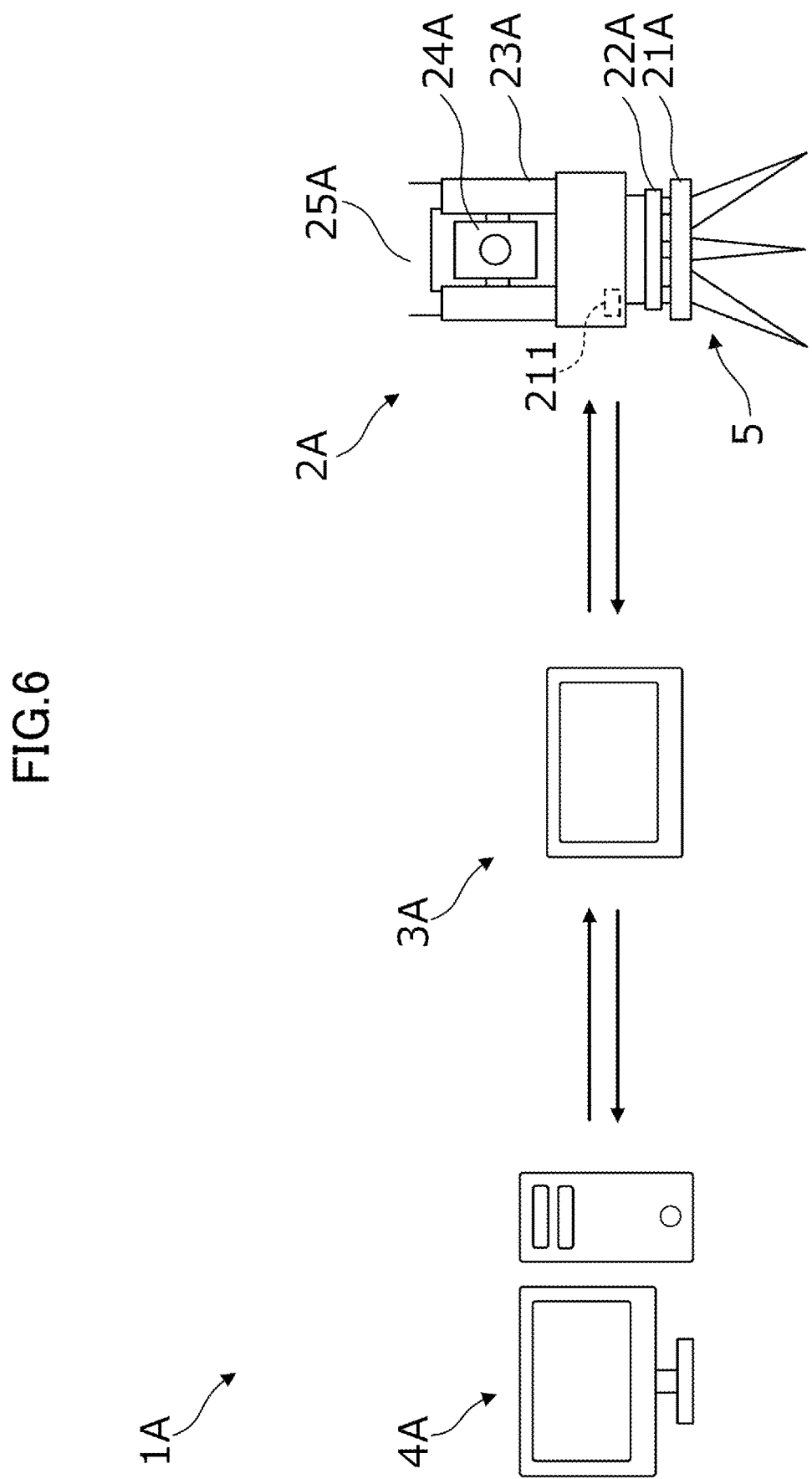
FIG. 6 shows an overall configuration of a surveying system according to a second embodiment of the present disclosure.

FIG. 6 shows an overall configuration of a surveying system 1A according to the second embodiment of the present invention. Note that the structures and arrangements of devices are shown schematically and different from actual scales for the sake of simplicity of description.

The surveying system 1A includes a surveying device 2A, a terminal 3A, and an external device 4A. In this embodiment, the surveying device 2A and the terminal 3A are communicably connected to each other. The terminal 3A and the external device 4A are also communicably connected to each other. A communication means is, for example, a wireless communication means such as Bluetooth (registered trademark), but may be a wired communication means connected via connection terminals. The surveying device 2A is a total station, for example, placed on one of legs 5 (e.g., a fixed core rod) of a tripod, and performs surveying by measuring the orientation and distance to a measurement target. The surveying device 2A includes a leveler 21A which is supported by the legs 5 and performs leveling, a base 22A above the leveler 21A, a main body 23A rotatable about the vertical axis of the base 22A, and a telescopic section 24A rotatable about the horizontal axis at the main body 23A. Accordingly, the telescopic section 24A is rotatable about the horizontal and vertical axes of the base 22A. Leveling may be performed manually by an operator by adjusting the leveler 21A, or may be automatic leveling.

The terminal 3A may be any device such as a personal computer, a tablet, a smartphone, or a PDA. The terminal 3A may function to operate the surveying device 2A at a remote site.

Figure 7:
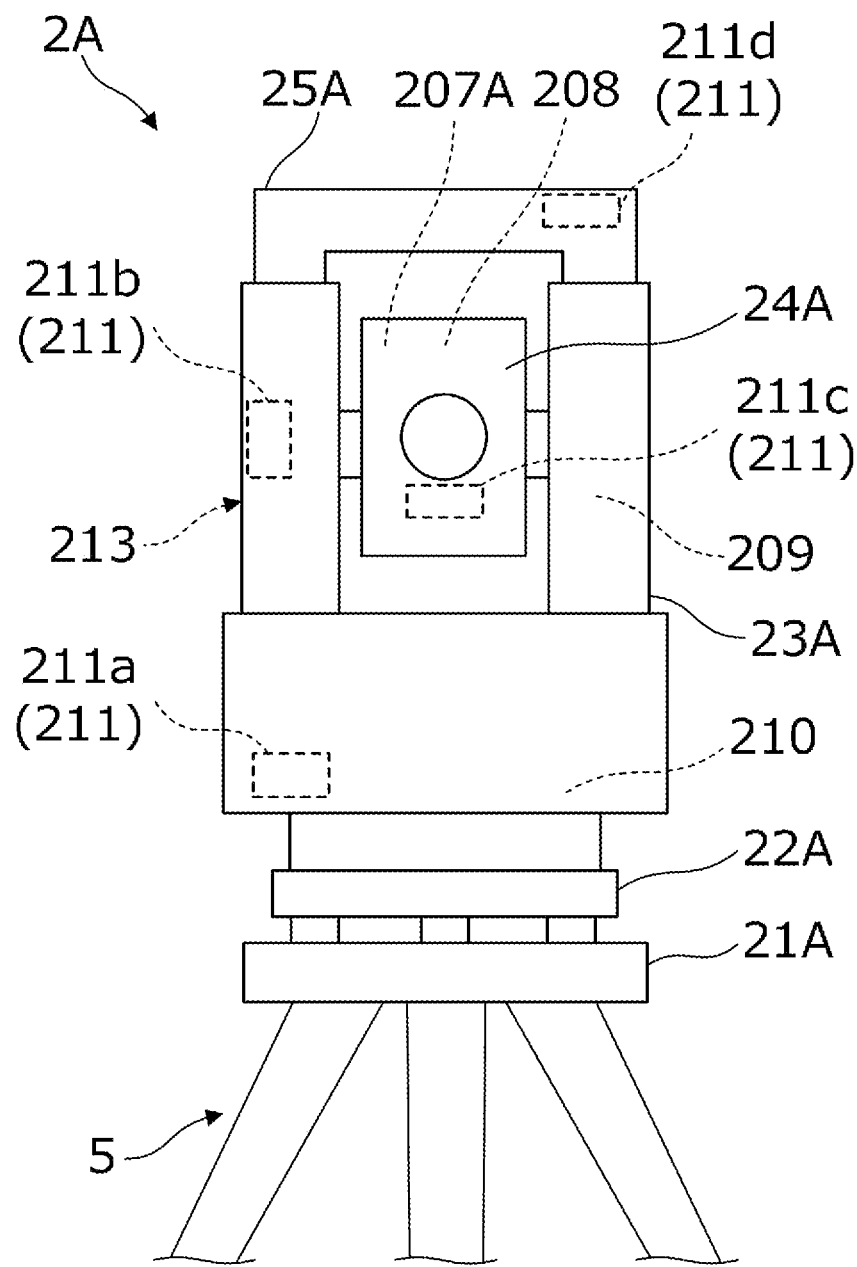
FIG. 7 is a schematic diagram of a surveying device including a plurality of acceleration sensors.

The external device 4A stores history information 431A on vibrations obtained by the surveying device 2A, reference information 432Aa, and other information (see FIG. 7). The external device 4A may be a server (e.g., an on-premise server or a cloud server) connected via a network such as a LAN or a WAN.

FIG. 7 is a schematic view of the surveying device 2A as seen from the front. The surveying device 2A includes an acceleration sensor 211. The acceleration sensor 211 is a detection unit directly or indirectly detects accelerations of a surveying unit 213 (see also the control block diagram in FIG. 8). The surveying unit 213 includes a distance measure 207A, a tracking light transmitter/receiver 208A, a horizontal orientation detector 209, a vertical orientation detector 210, and other parts. The distance measure 207A measures the distance to a measurement target. The tracking light transmitter/receiver 208A tracks a measurement target with tracking light. The surveying unit 213 is a functional unit capable of surveying a measurement target. The distance measure 207A, the tracking light transmitter/receiver 208A, the horizontal orientation detector 209, and the vertical orientation detector 210 included in the surveying unit 213 are directly or indirectly connected to each other by a housing, for example, of the surveying device 2A. When an external force vibrates the surveying device 2A or changes the attitude of the surveying device 2A, the acceleration sensor 211 detects an acceleration in accordance with the vibration transmitted to the surveying unit 213 or the change in the attitude. The acceleration sensor 211 is connected to a control unit 212 mounted on the surveying device 2A. When the acceleration sensor 211 detects an acceleration, the control unit 212 determines that the surveying device 2A has received the vibration from the outside or the attitude of the surveying device 2A has changed. Note that the control unit 212 averages the values detected by the acceleration sensor 211 at a predetermined number of detection times, and uses the obtained average as the acceleration to be processed in this embodiment. The acceleration sensor 211 may be placed in the housing, for example, forming the surveying unit 213 directly or indirectly via another internal member.

FIG. 7 is a schematic diagram of the surveying device 2A including a plurality of acceleration sensors 211 (211a to 211d). One or more acceleration sensors 211 may be provided.

The first acceleration sensor 211a is located on a lower part of the main body 23A closer to the base 22A. The second acceleration sensor 211b is located on a sidewall of the housing of the main body 23A above the first acceleration sensor 211a (opposite to the legs 5). The third acceleration sensor 211c is located in the telescopic section 24A. The fourth acceleration sensor 211d is located on a handle 25A. The acceleration sensors 211 are placed at a part or all of substantially the gravity center of the surveying device 2A (i.e., the location of the third acceleration sensor 211c in the example of FIG. 7), a position closer to the support end than the gravity center (i.e., the location of the first acceleration sensor 211a closer to the base 22A in the example of FIG. 7), and a position closer to a free end opposite to the support end than the gravity center (i.e., the location of the fourth acceleration sensor 211d closer to the handle 25A in the example of FIG. 7).

A fourth acceleration sensor 211d closer to the free end is displaced at a large amount when the surveying device 2A vibrates, and thus provides a high detection sensitivity. On the other hand, fourth acceleration sensors 211d at two right and left positions of the handle 25A detect the inclination of the surveying device 2A with a high detection sensitivity.

Note that the number and positions of the acceleration sensors 211 (211a to 211d) are examples and one or more acceleration sensors 211 can be provided at any position(s) of the surveying device 2A. The acceleration sensor(s) 211 may be provided at a part of the positions shown in FIG. 7 or in addition to the positions shown in FIG. 7.

Figure 8:
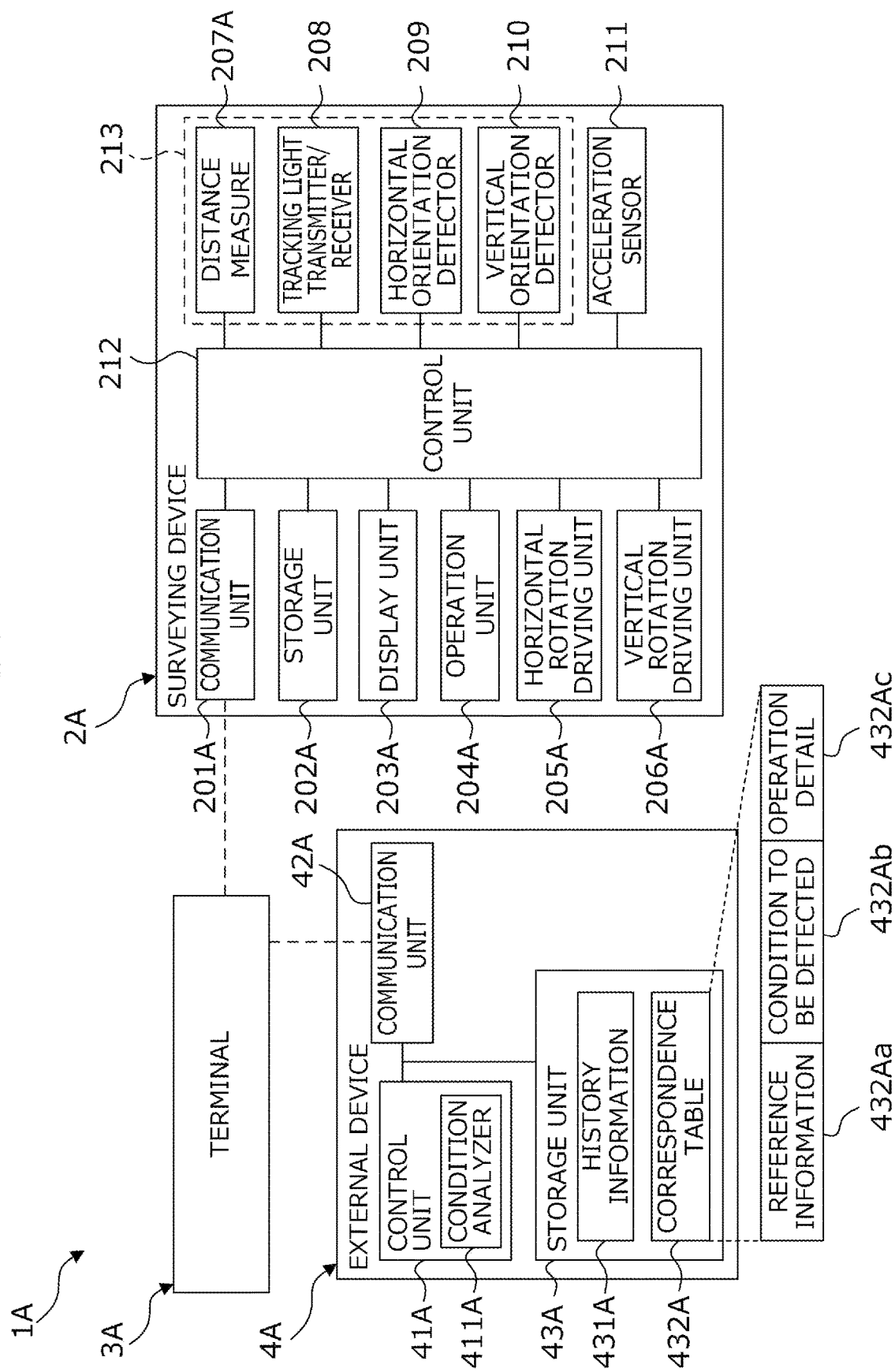
FIG. 8 is a control block diagram of the surveying system.

FIG. 8 is a control block diagram of the surveying system 1A. First, a configuration of the surveying device 2A will be described. A communication unit 201A is a communication means capable of communicating with the terminal 3A and other devices. A storage unit 202A stores various programs such as tracking and survey control programs, and various data such as surveying data, times of using a global positioning system (GPS), sizes (e.g., heights, widths, and depths) of the surveying device 2A, images received (imaged) by the tracking light transmitter/receiver 208A.

A display unit 203A displays images or others captured by the tracking light transmitter/receiver 208A, and is placed, for example, at a rear part of the main body 23A. An operation unit 204A is an operation means for inputting various operation instructions and settings. For example, the operation instructions may include instructions on ON/OFF switching of a power source, a trigger for starting surveying, switching of surveying modes, settings of a surveying cycle, and other operations. The operation unit 204A may include any operation device or input device such as a switch, a button, or a dial. If the display unit 203A is a touch panel, the display unit 203A and the operation unit 204A may be formed integrally.

The distance measure 207A includes a light transmitter that emits distance measuring light, and a light receiver that receives the distance measuring light emitted from the light transmitter and reflected by a measurement target. The measurement target is, for example, a prism that is a retroreflective member at a pinhole, for example. Note that the measurement target is not limited to the retroreflective member, and may be another reflective member (e.g., a reflective sheet, a target plate, or a wall) with a reflective function to an extent capable of reflecting light emitted from the surveying device 2A and causing the surveying device 2A to detect the reflected light.

For example, the distance measure 207A measures distances (oblique distances) from the surveying device 2A to a measurement target by emitting distance measuring light that is pulsed laser light and receiving the light reflected by the measurement target. Note that the distance measurement method is not limited to such a pulse method, and a well-known method is applicable such as what is called a "phase difference type" of measuring a distance based on the number of waves of laser light.

The tracking light transmitter/receiver 208A is a light source capable of irradiating a measurement target with tracking light. In addition, the tracking light transmitter/receiver 208A includes a light receiving element such as an image sensor (e.g., a charge coupled device (CCD) sensor or a complementary metal oxide semiconductor (CMOS) sensor) that receives a part of the tracking light reflected by a measurement target and converts the part of the tracking light into an electric signal, for example. The control unit 212 controls the function of tracking the measurement target by controlling horizontal and vertical rotation driving units 205A and 206A so that the light receiving element continues to receive the tracking light emitted from this light source.

The horizontal rotation driving unit 205A controls the main body 23A to be horizontally rotatable about the vertical axis with respect to the base 22A. The vertical rotation driving unit 206A controls the telescopic section 24A to be rotatable vertically about the horizontal axis with respect to the main body 23A.

The main body 23A includes therein the horizontal orientation detector (horizontal encoder) 209 and the vertical orientation detector (vertical encoder) 210. The horizontal orientation detector 209 detects a horizontal rotation orientation (i.e., a rotation orientation about the vertical axis) of the main body 23A. The vertical orientation detector 210 that detects a vertical rotation orientation (i.e., a rotation orientation about the horizontal axis) of the telescopic section 24A. The telescopic section 24A includes therein a telescope including an optical system capable of collimating a measurement target. The telescopic section 24A includes the built-in distance measure 207A including a distance measuring optical system. A part of the optical path of the distance measuring optical system of this distance measure 207A is shared with a part of the optical system of the telescope. The light emitted from the distance measure 207A described above or the tracking light transmitter/receiver 208A is guided coaxially with the collimation axis from an object side of the telescopic section 24A and emitted. In addition, the distance measure 207A or the tracking light transmitter/receiver 208A receives light incident through the opening surface of the telescopic section 24A.

The control unit 212 is located inside the main body 23A of the surveying device 2A, for example. The control unit 212 obtains, stores, and calculates various information such as orientations (i.e., horizontal and vertical orientations) detected by the horizontal and vertical orientation detectors 209 and 210, distances (oblique distances) measured by the distance measure 207A, and images captured by the tracking light transmitter/receiver 208A. The control unit 212 then displays results of obtainment and calculation on the display unit 203A, for example. In addition, the control unit 212 performs drive control and other operation of each unit in accordance with an operation on the operation unit 204A or a calculation result.

The terminal 3A includes a control unit, a storage unit, an operation unit, a display unit, a communication unit, and other units (details are not shown). The terminal 3A transmits and receives information to and from the surveying device 2A and the external device 4A via the communication unit. In addition, the terminal 3A operates the surveying device 2A at a remote site in accordance with an input operation to the operation unit, obtains information such as surveying results by the surveying device 2A, and displays the information on the display unit.

The external device 4A includes a control unit 41A, a communication unit 42A, and a storage unit 43A. The storage unit 43A stores the history information 431A, which is the past detection history of the accelerations detected by the acceleration sensor(s) 211 of the surveying device 2A, and a correspondence table 432A. The external device 4A obtains inputs related to the accelerations detected by the acceleration sensor(s) 211 of the surveying device 2A via the communication unit 201A, the terminal 3A, and the communication unit 42A. The external device 4A then stores the obtained inputs as the history information 431A. The history information 431A may include, for example, detection values of accelerations, detection times, and the conditions of the surveying device 2A (e.g., a condition where a large vibration or inclination occurs due to an earthquake or a blast) at the times of detection in correspondence with one another. The surveying device 2A stores the accelerations detected by the acceleration sensor(s) 211 as the history information 431A. At this time, if a detected acceleration is greater than or equal to a predetermined threshold value, the surveying device 2A may store the acceleration as the history information 431A. If the detected acceleration is smaller than the predetermined threshold value, the surveying device 2A may not include the acceleration in the history information 431A.

The correspondence table 432A stores the reference information 432Aa set based on the history information 431A, conditions 432Ab to be detected of the surveying device 2A, and operation details 432Ac corresponding to the reference information 432Aa. The reference information 432Aa is set based on the history information 431A. For example, an absolute value or a relative value set in advance with respect to an acceleration under a normally operatable condition of the surveying device 2A may be set as a threshold value for abnormality determination. Patterns of detecting an acceleration at the occurrence of abnormality in the past according to the history information 431A may be set as criteria for abnormality determination.

The reference information 432Aa includes threshold values and patterns of the vibrations and displacements of the surveying device 2A. The reference information 432Aa is set in correspondence to the conditions 432Ab to be detected such as shaking of a heavy machine, shaking due to wind, shaking when installed on an upper floor, shaking at the time of an earthquake, impact when another object collides with the surveying device 2A, or erroneous leveling of the surveying device 2A. That is, the conditions 432Ab to be detected are external physical factors classifiable based on accelerations and affecting the accuracy of surveying (including orientation measurement and distance measurement) or other operations of the surveying device 2A.

The operation details 432Ac are details of operations in response to the conditions 432Ab to be detected. One or both of an abnormality handling operation and a condition transition can be included as output control. The abnormality handling operation includes stop or prohibition of the measurement by the distance measure 207A or the tracking light transmitter/receiver 208A, and the orientation measurement by the horizontal or vertical orientation detector 209 or 210. In addition, the abnormality handling operation includes a display, an audio output, a lighting display, and other types of alerts (a speaker and a light emitting unit are not shown) at the time of abnormality determination.

As a condition transition, the surveying device 2A starts in the background. If an input of the acceleration detected by an acceleration sensor 211 indicates that the surveying device 2A is detected to be horizontally installed and fixed with a fixed core rod, the control unit 212 activates the main power source to display "Available" on the display unit 203A or to shift the surveying unit 213 to a standby mode capable of surveying.

The patterns of detecting the acceleration using the acceleration sensor(s) 211 (including the detection of accelerations using a plurality of acceleration sensors 211 (211a to 211d)) have a certain correlation with vibrations, changes in the attitude, and other characteristics that affect the surveying accuracy of the surveying device 2A. For example, the acceleration at the occurrence of an earthquake or a blast is detected as a value greater than the acceleration at a normal time. If the surveying device 2A is leveled and the accelerations detected by the acceleration sensor(s) 211 less vary, completion of installation can be determined. Accordingly, the control unit 41A may function as a condition analyzer 411A that determines which of the conditions 432Ab to be detected a newly detected acceleration corresponds to by executing a trained program trained by machine learning (what is called "deep learning") using the accelerations stored in the past history information 431A and the condition of the surveying device 2A as training data. The machine learning program and the trained program can be stored in the storage unit 43A.

Here, with reference to FIG. 9, for example, steps of a control method of the surveying system 1A will be described. First, in step S01, the control unit 212 detects an abnormal vibration of the surveying device 2A. Whether there is an abnormal vibration is determined based on whether the surveying device 2A receives a vibration, for example, from the outside and an acceleration greater than or equal to a predetermined threshold value is detected by an acceleration sensor 211. If the input of the acceleration detected by the acceleration sensor 211 is greater than or equal to the predetermined threshold value, the control unit 212 determines that an abnormal vibration has been detected and the process proceeds to step S02. Assume that a plurality of acceleration sensors 211 are used. In step S01, the control unit 212 determines the detection of an abnormal vibration, if some or all of the accelerations detected by the acceleration sensors 211 are determined to be greater than or equal to a predetermined threshold value.

In step S02, the control unit 212 refers to the correspondence table 432A stored in the external device 4A via the communication unit 201A, and determines whether the acceleration(s) detected in step S01 correspond(s) to the reference information 432Aa (e.g., meet(s) a set threshold value or correspond(s) to any of the patterns). Whether the detected accelerations correspond to the reference information 432Aa may be determined based on the acceleration(s) detected by a part of the acceleration sensors 211 or comprehensively based on the accelerations detected by the acceleration sensors 211. The control unit 212 performs the processing in step S03, if the determination in step S02 is true (Yes), and ends the process, if the determination in step S02 is false (No).

In step S02, the control unit 212 may determine whether the acceleration(s) detected by the acceleration sensor(s) 211 correspond(s) to any of conditions 432Ab to be detected, by executing a trained program that has trained using the accelerations according to the past history information 431A and the condition of the surveying device 2A. In this case as well, the control unit 212 performs the processing in step S03, if the determination in step S02 is true (Yes), and ends the process, if the determination in step S02 is false (No). In step S02, the control unit 212 may make the determination using one or both the reference information 432Aa and the trained program.

In step S03, the control unit 212 performs output control of the output unit capable of outputting information on the communication unit 201A, the display unit 203A, or other units in accordance with one of the operation details 432Ac corresponding to the condition 432Ab to be detected as determined in step S02, using the correspondence table 432A. The information outputtable by the output unit may include a control signal, for example.

An example of the operation details 432Ac is as follows. If an acceleration detected by an acceleration sensor 211 is determined to be caused by "shaking at the time of an earthquake", the control unit 212 stops or prohibits the distance or orientation measurement operation, or causes the display unit 203A to display the detection of an earthquake motion. Check may be performed while including a malfunction or an end of life (wear) of the surveying device 2A (including components, elements, and others) as the conditions 432Ab to be detected. The details or level of the conditions to be detected corresponding to the check results may be displayed as the operation details 432Ac on the display unit 203A, for example. For example, the control unit 212 causes the display unit 203A, for example, to display a part determined to be malfunctioning and the details of the malfunction together as the operation details 432Ac.

The following configuration has been described above in this embodiment. The surveying system 1A includes: the surveying device 2A capable of surveying a measurement target; an acceleration sensor 211 capable of detecting an acceleration of the surveying device 2A; the output unit; the storage unit 43 configured to store the history information 431A on the acceleration and the correspondence table 432A including a predetermined condition 432Ab to be detected based on the acceleration and an operation detail 432Ac in correspondence with each other; and the control unit 212 configured to control output of the output unit based on the operation detail 432Ac corresponding to the predetermined condition 432Ab of the surveying device 2A associated in accordance with the history information 431A, if the acceleration detected by the acceleration sensor 211 is determined to correspond to the predetermined condition 432Ab. This configuration reduces surveying with an unleveled device and/or erroneous constructions and allows automatic switching of the operation modes of the surveying device 2A. In addition, this configuration allows reference to the past history information 431A of the surveying device 2A and thus allows check of the condition of the surveying device 2A in an emergency or abnormal situation. Alternatively, highly convenient surveying system 1A, surveying device 2A, and control method are provided, while grasping the condition of the surveying device 2A.

The second embodiment of the present disclosure has been described above. The aspects of the present disclosure are not limited to this second embodiment.

For example, while a configuration has been described above in the second embodiment where the surveying device 2A communicates with the external device 4A via the terminal 3A, the surveying device 2A may communicate with the external device 4A directly.

The history information 431A and the correspondence table 432A may be stored in a single device (the external device 4A in this embodiment) or in a plurality of devices.

Figure 9:
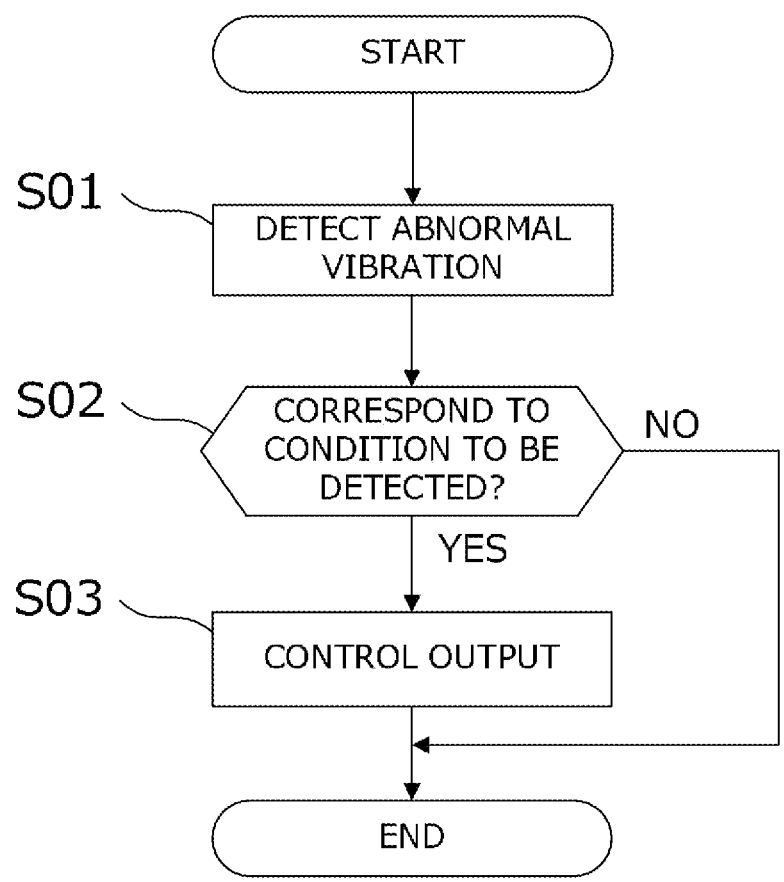
FIG. 9 is a flowchart showing a control method of the surveying system.

The output unit whose output is controllable in step S03 of FIG. 9 may be included in the surveying device 2A, or may be included in the terminal 3A, the external device 4A, or another device.

The following is exemplary disclosure of the second embodiment.

[1] A surveying system including:
a surveying device capable of surveying a measurement target;
an acceleration sensor capable of detecting an acceleration of the surveying device;
an output unit capable of outputting information;
a storage unit configured to store: history information on the acceleration; and
a correspondence table including a predetermined condition to be detected based on the acceleration and an operation detail in correspondence with each other; and
a control unit configured to control output of the output unit based on the operation detail corresponding to the predetermined condition to be detected of the surveying device associated in accordance with the history information, if the acceleration detected by the acceleration sensor is determined to correspond to the predetermined condition to be detected.

[2] The surveying system of [1], wherein
the control unit functions as a condition analyzer capable of determining whether the acceleration detected by the acceleration sensor corresponds to any one of conditions to be detected by executing a trained program that has trained using the acceleration according to the history information and a condition to be detected of the surveying device.

[3] The surveying system of [1], wherein
the correspondence table includes reference information that is a determination criterion set based on the history information in correspondence with the predetermined condition to be detected and the operation detail, and
the control unit determines which of conditions to be detected the acceleration detected by the acceleration sensor corresponds to, if the acceleration satisfies the determination criterion.

[4] The surveying system of any one of [1] to [3], wherein
the acceleration is obtained by averaging values detected by the acceleration sensor at a predetermined number of detection times.

[5] The surveying system of any one of [1] to [4], wherein
the operation detail includes a plurality of operation details corresponding to one or both of an abnormality handling operation and a condition transition.

[6] The surveying system of any one of [1] to [5], wherein
the acceleration sensor is placed at any or each of: a gravity center of the surveying device; a position closer to a support end than the gravity center; and a position closer to a free end opposite to the support end than the gravity center.

[7] A surveying device including:
a surveying unit capable of surveying a measurement target;
an acceleration sensor capable of detecting an acceleration;
an output unit capable of outputting information;
a storage unit configured to store: history information on the acceleration; and a correspondence table including a predetermined condition to be detected based on the acceleration and an operation detail in correspondence with each other; and
a control unit configured to control output of the output unit based on the operation detail corresponding to the predetermined condition to be detected associated in accordance with the history information, if the acceleration detected by the acceleration sensor is determined to correspond to the predetermined condition to be detected.

[8] A control method of a surveying system including:
a surveying device capable of surveying a measurement target; an acceleration sensor capable of detecting an acceleration of the surveying device; an output unit capable of outputting information; and a storage unit configured to store: history information on the acceleration; and a correspondence table including a predetermined condition to be detected based on the acceleration and an operation detail in correspondence with each other, the control method including:
determining whether the acceleration detected by the acceleration sensor corresponds to the predetermined condition to be detected of the surveying device associated in accordance with the history information; and
controlling output of the output unit based on the operation detail corresponding to the predetermined condition to be detected, if the acceleration detected is determined to correspond to the predetermined condition to be detected.

What is claimed is:
1. A system, comprising:
a device capable of surveying a measurement target or emitting laser light;
an acceleration sensor capable of detecting an acceleration of the device;
an output unit capable of outputting information;
a storage unit configured to store:
history information on the acceleration; and
a correspondence table including a predetermined condition to be detected based on the acceleration and an operation detail in correspondence with each other; and
a control unit configured to control output of the output unit based on the operation detail corresponding to the predetermined condition to be detected, of the device, associated in accordance with the history information, if the acceleration detected by the acceleration sensor is determined to correspond to the predetermined condition to be detected,
wherein
the correspondence table includes reference information that is a determination criterion set based on the history information in correspondence with the predetermined condition to be detected and the operation detail,
the reference information includes a threshold value and a pattern of a vibration or a displacement of the device, the predetermined condition to be detected is external physical factors classifiable based on the acceleration and affecting an accuracy of the device, and the control unit determines whether the acceleration detected by the acceleration sensor corresponds to predetermined condition to be detected, if the acceleration satisfies the determination criterion.

2. The system of claim 1, wherein the control unit functions as a condition analyzer capable of determining whether the acceleration detected by the acceleration sensor corresponds to any one of conditions to be detected, by executing a trained program that has trained using the acceleration according to the history information and a condition of the device.

3. The system of claim 1, wherein the acceleration is obtained by averaging detection values detected by the acceleration sensor at a predetermined number of detection times.

4. The system of claim 1, wherein the operation detail includes a plurality of operation details corresponding to one or both of an abnormality handling operation and a condition transition.

5. A device, comprising:

a surveying unit capable of surveying a measurement target or a rotary light projecting section capable of emitting laser light;

an acceleration sensor capable of detecting an acceleration;

an output unit capable of outputting information;

a storage unit configured to store:
  history information on the acceleration; and
  a correspondence table including a predetermined condition to be detected based on the acceleration and an operation detail in correspondence with each other; and a control unit configured to control output of the output unit based on the operation detail corresponding to the predetermined condition to be detected associated in accordance with the history information, if the acceleration detected by the acceleration sensor is determined to correspond to the predetermined condition to be detected, wherein the correspondence table includes reference information that is a determination criterion set based on the history information in correspondence with the predetermined condition to be detected and the operation detail, the reference information includes a threshold value and a pattern of a vibration or a displacement of the device, the predetermined condition to be detected is external physical factors classifiable based on the acceleration and affecting an accuracy of the device, and the control unit determines whether the acceleration detected by the acceleration sensor corresponds to predetermined condition to be detected, if the acceleration satisfies the determination criterion.

6. A control method of a system, the system including:

a device capable of surveying a measurement target or emitting laser light; an acceleration sensor capable of detecting an acceleration of the device; an output unit capable of outputting information; and a storage unit configured to store history information on the acceleration and a correspondence table including a predetermined condition to be detected based on the acceleration and an operation detail in correspondence with each other, wherein the correspondence table includes reference information that is a determination criterion set based on the history information in correspondence with the predetermined condition to be detected and the operation detail, wherein the reference information includes a threshold value and a pattern of a vibration or a displacement of the device, and wherein the predetermined condition to be detected is external physical factors classifiable based on the acceleration and affecting an accuracy of the device, the control method characterized by comprising:

determining whether the acceleration detected by the acceleration sensor corresponds to the predetermined condition to be detected, of the device, if the acceleration satisfies the determination criterion; and controlling output of the output unit based on the operation detail corresponding to the predetermined condition to be detected, if the acceleration detected is determined to correspond to the predetermined condition to be detected.

* * * * *